US012541658B2

(12) United States Patent
Heckman et al.

(10) Patent No.: US 12,541,658 B2
(45) Date of Patent: Feb. 3, 2026

(54) PREDICTIVE TRANSLATION OF TRANSCRIPTS FOR MULTIMEDIA ASSETS

(71) Applicant: Microsoft Technology Licensing, LLC, Redmond, WA (US)

(72) Inventors: Nicholas Tegan Heckman, Kirkland, WA (US); Trishabh Chadda, New Delhi (IN); John Alexander De La Pava Pena, Bogota (CO)

(73) Assignee: Microsoft Technology Licensing, LLC, Redmond, WA (US)

( * ) Notice: Subject to any disclaimer, the term of this patent is extended or adjusted under 35 U.S.C. 154(b) by 313 days.

(21) Appl. No.: 18/377,722

(22) Filed: Oct. 6, 2023

(65) Prior Publication Data

US 2025/0117604 A1    Apr. 10, 2025

(51) Int. Cl.
*G06F 40/58* (2020.01)
*G06F 16/951* (2019.01)
*G06F 16/957* (2019.01)
*G06F 40/263* (2020.01)
*G06F 40/56* (2020.01)

(52) U.S. Cl.
CPC ............ *G06F 40/56* (2020.01); *G06F 16/951* (2019.01); *G06F 16/9577* (2019.01)

(58) Field of Classification Search
CPC ...... G06F 40/56; G06F 16/951; G06F 40/263; G06F 40/58
USPC ..................................................... 704/5, 8–9
See application file for complete search history.

(56) References Cited

U.S. PATENT DOCUMENTS

| | | |
|---|---|---|
| 2013/0308922 A1 | 11/2013 | Sano et al. |
| 2019/0110096 A1 | 4/2019 | Shaw et al. |
| 2019/0244606 A1 | 8/2019 | Baughman et al. |
| 2022/0171929 A1* | 6/2022 | Mishra ................. G06F 40/40 |
| 2022/0199086 A1 | 6/2022 | Liu et al. |

FOREIGN PATENT DOCUMENTS

IN    202341029429 A    5/2023

OTHER PUBLICATIONS

"Azure Video Indexer", Retrieved from: https://azure.microsoft.com/en-in/products/video-indexer, Jan. 24, 2023, pp. 1-6.

(Continued)

*Primary Examiner* — George C Monikang
(74) *Attorney, Agent, or Firm* — Klarquist Sparkman, LLP

(57) ABSTRACT

A computer-implemented method for selective indexing of target content is disclosed. A web hosting system hosting the target content can collect user access data for the target content, which is presented in a first language; extract user locations from the user access data; detect, from the first user locations, an area associated with a second language that is different from the first language; and evaluate a trigger condition based at least in part on comparing a content metric, which measures user access to the target content from the area, to a content threshold. Responsive to detecting satisfaction of the trigger condition, the system can translate the target content from the first language to the second language; and index the target content presented in the second language so as to enable the target content to be searched using the second language.

20 Claims, 4 Drawing Sheets

(56) References Cited

OTHER PUBLICATIONS

Apostolidis, et al., "Video Summarization Using Deep Neural Networks: A Survey", In Repository of arXiv:2101.06072v2, Sep. 27, 2021, pp. 1-26.
Teja, et al., "A Novel Approach in the Automatic Generation of Regional Language Subtitles for Videos in English", In Proceedings of the IEEE 8th International Conference for Convergence in Technology, Apr. 7, 2023, pp. 1-6.
Dyckman, et al., "The Indexing Configuration Guide", Retrieved from: https://learn.microsoft.com/en-us/azure/azure-video-indexer/indexing-configuration-guide, Apr. 29, 2023, pp. 1-6.
Henkel, et al., "Media Transcription, Translation and Language Identification", Retrieved from: https://learn.microsoft.com/en-us/azure/azure-video-indexer/transcription-translation-lid, Aug. 1, 2023, pp. 1-6.
Henkel, et al., "What is Azure AI Video Indexer?", Retrieved from: https://learn.microsoft.com/en-us/azure/azure-video-indexer/video-indexer-overview, Aug. 2, 2023, pp. 1-7.
Kornich, et al., "Transparency Note for Azure Video Indexer", Retrieved from: https://learn.microsoft.com/en-us/legal/azure-video-indexer/transparency-note, Aug. 2, 2023, pp. 1-10.
Martin, et al., "How to Reach a Non-English-Speaking YouTube Audience", Retrieved from: https://www.socialmediaexaminer.com/youtube-reach-non-english-speaking-audience-how-to/, Sep. 19, 2017, pp. 1-22.
Sagiv, et al., "Video Indexer Introduces Expanded Regions, Multi-language Identification and Transcription and More", Retrieved from: https://techcommunity.microsoft.com/t5/azure-ai-services-blog/video-indexer-introduces-expanded-regions-multi-language/ba-p/1926467, Dec. 15, 2023, pp. 1-9.

* cited by examiner

PREDICTIVE TRANSLATION OF TRANSCRIPTS FOR MULTIMEDIA ASSETS

BACKGROUND

Online content discovery and indexing are important processes that underpin today's digital world. Content discovery involves helping users find relevant information or resources from the vast expanse of the Internet, while indexing is the systematic organization of web content for efficient retrieval. Search engines (e.g., Bing, Google, etc.) employ complex algorithms to discover and index web pages, making them accessible to users. Although various approaches have been developed to perform content discovery and indexing, there still exists ample opportunity for making such process more intelligent and efficient.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In some aspects, the techniques described herein relate to a computer-implemented method for selective indexing of target content. The method includes: collecting, by a web hosting system which hosts the target content, first user access data for the target content, wherein the target content is presented in a first language; extracting first user locations from the first user access data; detecting, from the first user locations, an area associated with a second language that is different from the first language; evaluating a trigger condition, wherein the trigger condition is based at least in part on comparing a content metric, which measures user access to the target content from the area, to a content threshold; and responsive to detecting satisfaction of the trigger condition: translating the target content from the first language to the second language; and indexing the target content presented in the second language so as to enable the target content to be searched using the second language.

In some aspects, the techniques described herein relate to a computing system for selective indexing of target content. The computing system includes: memory; one or more hardware processors coupled to the memory; and one or more computer readable storage media storing instructions that, when loaded into the memory, cause the one or more hardware processors to perform operations including: collecting, by a web hosting system which hosts the target content, first user access data for the target content, wherein the target content is presented in a first language; extracting first user locations from the first user access data; detecting, from the first user locations, an area associated with a second language that is different from the first language; evaluating a trigger condition, wherein the trigger condition is based at least in part on comparing a content metric, which measures user access to the target content from the area, to a content threshold; and responsive to detecting satisfaction of the trigger condition: translating the target content from the first language to the second language; and indexing the target content presented in the second language so as to enable the target content to be searched using the second language.

In some aspects, the techniques described herein relate to one or more non-transitory computer-readable media having encoded thereon computer-executable instructions causing one or more processors to perform operations for selective indexing of target content. The operations include: collecting, by a web hosting system which hosts the target content, first user access data for the target content, wherein the target content is presented in a first language; extracting first user locations from the first user access data; detecting, from the first user locations, an area associated with a second language that is different from the first language; evaluating a trigger condition, wherein the trigger condition is based at least in part on comparing a content metric, which measures user access to the target content from the area, to a content threshold; and responsive to detecting satisfaction of the trigger condition: translating the target content from the first language to the second language; indexing the target content presented in the second language so as to enable the target content to be searched using the second language; and prompting a large language model to generate a summary of the target content using the second language.

As described herein, a variety of other features and advantages can be incorporated into the technologies as desired.

DETAILED DESCRIPTION

Overview of Content Discovery and Indexing

Figure 1:
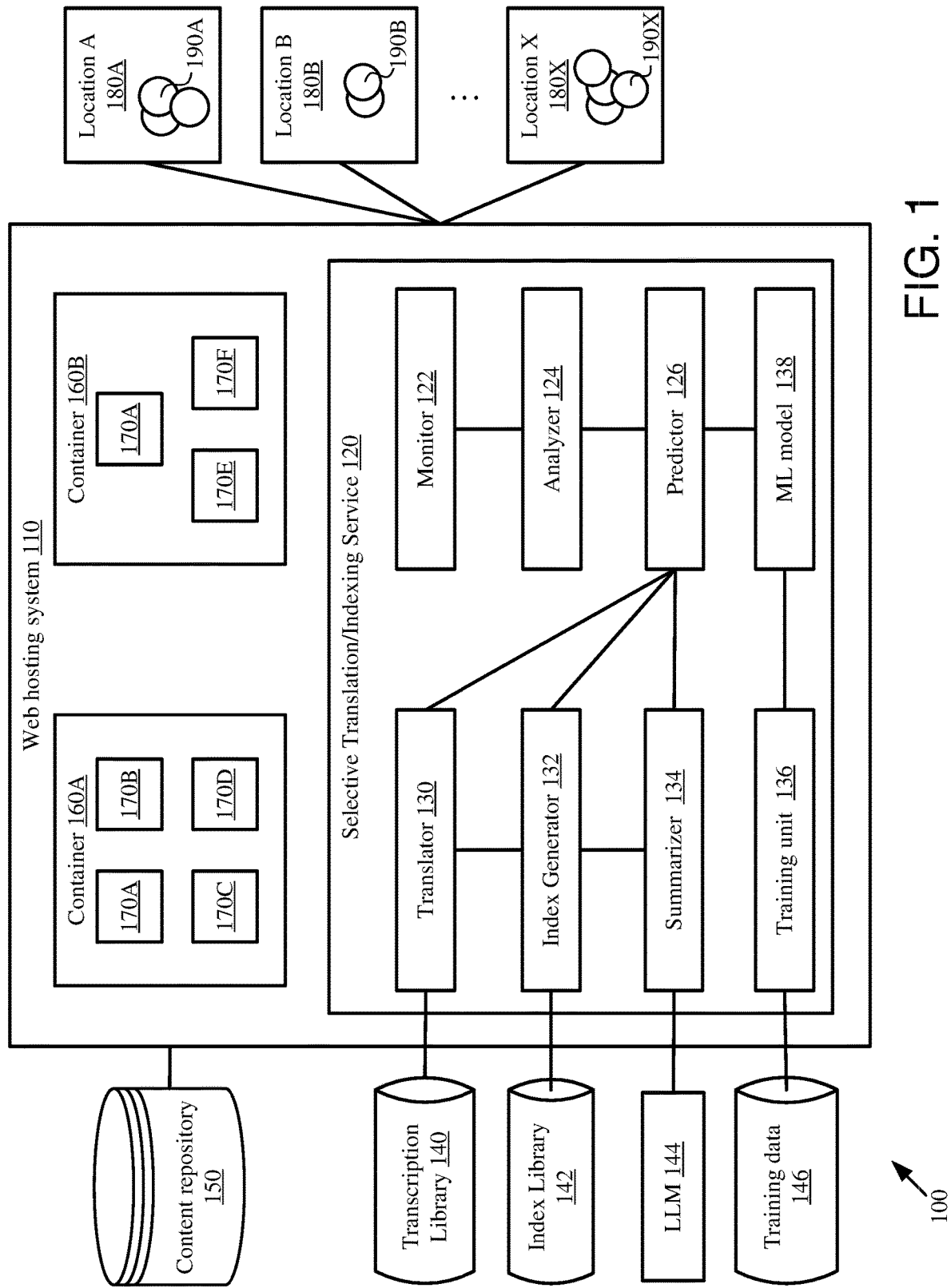
FIG. 1 is a block diagram depicting an example computing system for selective indexing of target content.

Content discovery and indexing involve the systematic organization and retrieval of information from the vast realm of digital content available on the Internet, also known as "online content" or "multimedia assets." This process is pivotal in enabling users to find relevant information efficiently. As described hereinafter, online content can include video content, audio content, text-based content, or any combination thereof.

Content discovery usually starts with searches conducted by users. When a user initiates a search, a search engine can process the query, identifying keywords and user intent. The search engine can deploy web crawlers or bots to traverse the Internet, visiting web pages and other digital resources. During this process, the search engine can extract textual content, links, and metadata. The extracted data can be organized into an index, which can be a structured database containing information about the content, its keywords, and its location on the web. Indexing may involve language identification to categorize content by language. The search engine can also rank indexed content based on relevance to the query. Different ranking algorithms may be used by considering factors like keyword matches, user behavior, and quality indicators, etc. The search engine can then retrieve the most relevant content from the index and present it to the user in the form of search results.

However, challenges arise when users' languages differ from the language of the content. For example, for content presented in one specific language, individuals whose native languages differ from the specific language often encounter difficulties in locating the content due to language barriers (e.g., the individuals may not know what keywords to search using the specific language). Even when those individuals do find the content (e.g., through recommendations of friends), comprehending the content can be a struggle because it is not presented in the users' native languages. Although transcriptions of the content (e.g., if made available by the content provider) can be helpful in some circumstances, their utility is limited if the transcriptions are only in the specific language. On-demand translation of transcriptions and other metadata can help comprehension, but it does not aid in the discovery of the content. This is because for content to be discoverable through search, the transcription or translation needs to be completed prior to the indexing of the content. However, for millions of items of content hosted by a web hosting service, it would be impractical to translate, in advance, every item of content into many different languages. Not only such indiscriminate translation could potentially deplete computing resources (e.g., CPU time, memory, disk space, etc.), but also would be tremendously wasteful because most of the translated content may never be needed or accessed by potential users.

The technologies discussed here address numerous technical challenges described above by introducing systems and associated methods that can predict which online content should be translated into which languages, and then selectively translate and index only that online content into the corresponding languages. Such selective indexing approach enhances the accessibility of the online content and make it more understandable to speakers of different languages.

Example Computing System for Selective Indexing of Online Content

FIG. 1 shows a block diagram of an example computing system 100 configured for selective indexing of online content, according to the technologies described herein.

The computing system 100 includes a web hosting system 110 in communication with a content repository 150. In the depicted example, the content repository 150 is outside the web hosting system 110. In some examples, the content repository 150 can be part of the web hosting system 110.

Selected content, e.g., 170A, 170B, . . . , 170F (collectively, content 170) can be hosted on one or more containers 160 (two containers 160A, 160B are shown in FIG. 1 as examples). The container can be defined by the web hosting system 110 as a structure that can host various types of online content like websites, channels, playlists, forums, online user groups/communities, galleries, portfolios, podcast platform, etc. In some circumstances, selected content can appear in multiple containers (e.g., FIG. 1 shows that content 170A appears in both containers 160A and 160B). Through an interface provided by the web hosting system 110, users 190A, 190B, . . . , 190X (collectively, users 190) at different geographical locations (areas), e.g., 180A, 180B, . . . , 180X (collectively, locations 180) can access various content 170 hosted on the containers 160 (assuming the users 190 have required registration and/or subscription credentials).

Although not shown in detail, the web hosting system 110 can include several functional components including, but not limited to: a web server configured to handle requests from users (e.g., web browsers) and serve web content in response; a database server configured to manage data related to the website (e.g., user information, content details, etc.); a content delivery network configured to deliver content to users based on their geographic locations and/or the origin of the website; a security system configured to protect the web content and user's data, analytics tools configured to gather data about website usage, visitor demographics, and performance metrics; monitoring tools configured to check the performance of web servers, databases, and other infrastructure components to identify and address issues promptly; a cache system configured to store copies of frequently accessed web content in memory to reduce the load on backend servers and speed up content delivery; a backup/recovery system configured to ensure data integrity and availability, etc.

As shown in FIG. 1, the web hosting system 110 can include a selective translation and indexing service (STIS) 120 configured to implement selective indexing of online content. The STIS 120 can include a monitor 122, an analyzer 124, a predictor 126, a translator 130, and an index generator 132. Optionally, the STIS 120 can also include a machine learning (ML) model 138, and a training unit 136 configured to train the ML model 138 using previously collected training data 146.

As described herein, the monitor 122 can be configured to collect access data of users 190 for various content 170 hosted on the one or more containers 160. As described herein, user access data encompass a wide range of information related to user interactions with content 170 hosted by the web hosting system 110. Example user access data collected by the monitor 122 include IP addresses to determine user locations, user agent information to identify browsers and devices, page view statistics to track popular content, timestamps for session analysis, referral sources to understand traffic sources, user interactions like clicks and form submissions, cookies and session data for personalization, error logs for troubleshooting, user account details for authentication, e-commerce transaction records for online purchases, user preferences for customization, user's GPS data (e.g., if the user's device is a smartphone or a GPS-enabled tablet and grants permission to provide location-based services), etc.

The analyzer 124 can be configured to analyze the collected user access data, as well as metadata about the content 170. For example, for target content, the analyzer 124 can extract, from the user access data, user locations from which the target content has been accessed by users, and further can detect prevailing languages associated with those extracted user locations. For the target content, the analyzer 124 can also extract associated metadata, such as the content duration, content size, content type, creator/owner of the content, content source, content viewing statistics, etc.

Based on the analysis results provided by the analyzer 124, the predictor 126 can be configured to predict, for the target content, probabilities of different languages spoken by users who would likely access the target content. Such predictions can be based on predefined heuristic rules and/or the pretrained ML model 138. As described further below, the training unit 136 can be configured to train the ML model 138 using training data 146, which can include historical user access data for a set of content 170 hosted by the web hosting system 110.

Based on the prediction results of the predictor 126, the translator 130 can be triggered to selectively translate the target content into desired languages. For video and/or audio content, such translation can be performed using transcripts of the video and/or audio content. For text-based content, such translation can be textual translation of the content itself. Different trigger conditions can be used, as described further below. As an example, if the target content is originally presented in English, and the predictor 126 predicts that there is a sufficiently high probability (e.g., greater than a predefined threshold) that users who speak Spanish would likely access the target content, the translator 130 can trigger automatic translation of the target content from English to Spanish. On the other hand, no translation is triggered if the probability of the target content being accessed by users whose native language is other than English is sufficiently small (e.g., below the predefined threshold).

In some examples, the translation results can be saved in a transcription library 140. For example, for video content, video transcript can be saved in a video text track (VTT) file, in which each line of text is associated with a timestamp that specifies when that line of text should appear then disappear during video playback. The video transcript can be translated into multiple languages, and each language's transcript can be included in a separate VTT file stored in the transcription library 140.

For translated content, indexing can be performed, e.g., by the index generator 132, to generate a structured catalog or database of the translated content for quick retrieval. For example, the index generator 132 can parse the translated content to extract relevant details, followed by tokenization, which breaks down the translated text into searchable units like words or phrases. In some cases, the translated text can be normalized (e.g., converting text to lowercase and reducing words to their root form using stemming or lemmatization) to ensure case-insensitive searching and handle word variations. The results of the indexing can be saved in an index library 142. Thus, when a user initiates a search query using the language of the translated content, the web hosting system 110 can search the index library 142 to rapidly locate and present the translated content, expediting content discovery and retrieval.

To facilitate understanding of target content, a synopsis or summary of the target content can be generated, e.g., by the summarizer 134. If the target content is translated to a specific language, the summary can also be presented in the specific language. In some implementations, the summarizer 134 can be configured to prompt a generative artificial intelligence (AI) model to generate the summary of the content. For example, the generative AI model can be a large language model (LLM) 144, and the summarizer 134 can prompt the LLM 144 to generate a summary based on a transcript of the target content.

As described herein, the LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In the depicted example, the STIS 120 is a component of the web hosting system 110. In some implementations, the STIS 120 can be a component that is external to, but in communication with, the web hosting system 110. In some implementations, parts of the STIS 120 can be inside the web hosting system 110 (e.g., the monitor 122 and the analyzer 124 can be respective parts of the monitoring tools and analytics tools of the web hosting system 110) while other parts of the STIS 120 (e.g., the translator 130, the index generator 132, and/or the summarizer 134, etc.) can be outside the web hosting system 110.

In the depicted example, the transcription library 140, the index library 142, the LLM model 144, and the training data 146 are outside the STIS 120. In other implementations, any or all of the components 140, 142, 144, and 146 can be part of the STIS 120.

The described computing systems can be networked via wired or wireless network connections, including the Internet. Alternatively, systems can be connected through an intranet connection (e.g., in a corporate environment, government environment, or the like) or over a bus or other interconnection mechanism in a local computing device or system.

The computing system 100 and any of the other systems/subsystems described herein can be implemented in conjunction with any of the hardware components described herein, such as the computing systems described below (e.g., processing units, memory, and the like). In any of the examples herein, the content, the user access data, the user locations, the translations, the indexing results, and the like can be stored in one or more computer-readable storage media or computer-readable storage devices. The technologies described herein can be generic to the specifics of operating systems or hardware and can be applied in any variety of environments to take advantage of the described features.

Example Method for Performing Selective Indexing of Target Content

Figure 2:
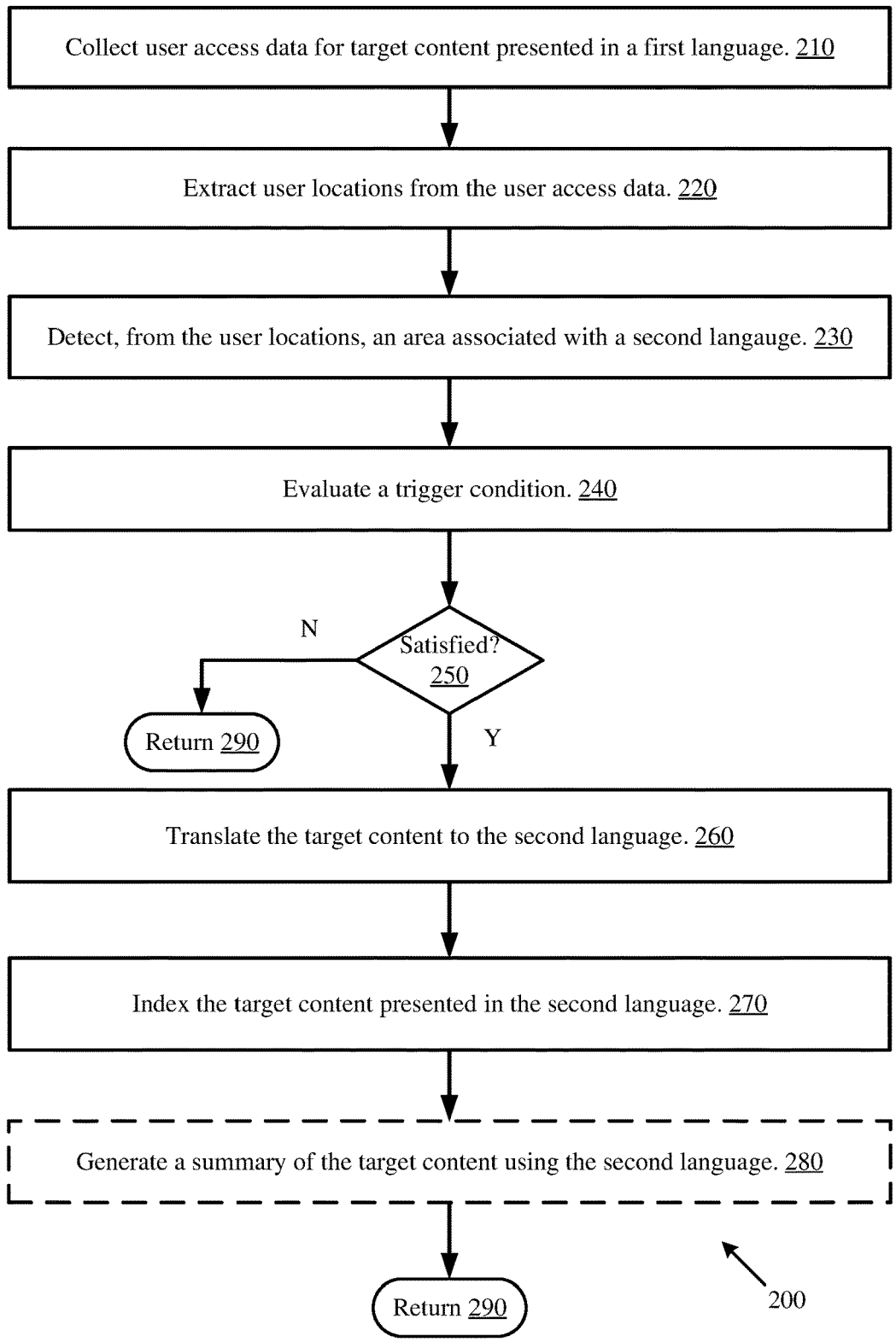
FIG. 2 is a flowchart illustrating an example overall method for implementing selective indexing of target content.

FIG. 2 is a flowchart illustrating an example overall method 200 for implementing selective indexing of target content (e.g., any of the content 170 depicted in FIG. 1) hosted on a web hosting system (e.g., the web hosting system 110). The method 200 can be performed by the STIS 120 of FIG. 1.

At step 210, user access data for the target content can be collected by the web hosting system (e.g., by the monitor 122). For illustration purposes, it is assumed that the target content is presented in a first language.

In some examples, the target content can include video content. In some examples, the target content can include audio content. In some examples, the target content can include text-based content.

At step 220, user locations can be extracted from the user access data (e.g., by the analyzer 124). The analyzer 124 can extract user locations using several approaches. For example, user locations can be extracted using IP geolocation. When a user accesses a website, the user's IP address is recorded. The analyzer can query a geolocation database to map the IP address to a physical location, typically by matching it to a range of known IP addresses with associated locations. As another example, user locations can be extracted from GPS data from mobile devices if the user has granted permission. In some scenarios, user locations can be inferred from HTTP headers, e.g., the Accept-Language header, which can give clues about the user's country of origin based on their language preference. In some circumstances, previous location information provided by the user can be stored and retrieved via cookies or local storage. Additionally, if users are required to create an account or fill in details, they might provide their location information willingly.

At step 230, from the user locations, an area associated with a second language that is different from the first language can be detected (e.g., by the analyzer 124). For example, when using IP geolocation to extract user locations, the geolocation database may provide additional data like city, region, and country of the user, and the language associated with the city, region, and country can be determined accordingly. As another example, GPS data, received from satellites, provides latitude and longitude coordinates, which can be used to pinpoint a user's geographical area. The prevailing language of that area can be obtained from a geographical language database or inferred by analyzing aggregated user data such as browser language settings and search queries from that geographic area. Similarly, the HTTP headers containing user's language preferences, the cookies storing user's geolocation data, and user-provided location information (e.g., during account creation) can be analyzed to determine what language is associated with the user's location.

At step 240, a trigger condition can be evaluated (e.g., by the predictor 126). As described herein, the trigger condition can be based at least in part on comparing a content metric (e.g., count, frequency, etc.), which measures user access to the target content from the area, to a content threshold. Examples of trigger conditions are explained below.

As described further below, in some examples, the trigger condition can be further based at least in part on one or more of: a group in which the target content is categorized by the web hosting system; access patterns for other content in the group; a creator of the target content; access patterns for other content created by the creator of the target content; a container that hosts the target content on the web hosting system; access patterns for other content in the container; and/or other metadata about the target content.

At step 250, a condition check can be performed. If the trigger condition is not satisfied, the method can return at step 290. As a result, no translation or indexing of the target content is performed.

On the other hand, if the trigger condition is satisfied, the method can proceed to step 260, where the target content can be translated from the first language to the second language (e.g., by the translator 130). For example, the translator 130 can leverage machine translation APIs or libraries, such as Google Translate or neural machine translation models like transformer-based models (e.g., recurrent neural network model). Generally, the translation process starts by tokenizing text of the target content (presented in the first language), breaking it into words or sub-words. These tokens are then fed into the translation model, which has been pre-trained on vast multilingual datasets to learn linguistic patterns and relationships between different languages. The translation model can generate a sequence of tokens in the second language, which are then recombined to form coherent translated sentences.

Then, at step 270, the target content presented in the second language can be indexed (e.g., by the index generator 132) so as to enable the target content to be searched using the second language. For example, the index generator 132 can scan the target content and collect relevant content data (e.g., transcripts, etc.). Such data can be parsed to extract meaningful information such as text and metadata. The extracted data can be processed and organized into an index, a data structure that is optimized for search operations. The index can include information about the frequency and location of each word in the target content, which aids in relevance ranking during search queries. In some examples, the index generator 132 can use stemming (e.g., reducing words to their root form) and stop word removal (e.g., filtering out common words) to enhance the efficiency of the index.

Optionally, at step 280, a summary of the target content can be generated using the second language, e.g., by prompting a large language model (LLM). Then, the method can return at step 290.

In other words, translation, indexing, and summarization of the target content are selectively performed only when the condition check at step 250 returns yes. This can improve utilization of computer resources by performing translation, indexing, and summarizing operations when and where they are most likely to be useful, and by avoiding translation, indexing, and summarizing operations for other web content.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Trigger Conditions

As described above, whether or not target content is selected to be translated to a specific language and then indexed can be based on evaluation of a trigger condition, which can be based at least in part on comparing a content metric, which measures user access to the target content from an area (associated with the specific language) to a predefined content threshold. In some examples, other trigger conditions can be used.

For the following discussion, the user access data referred to in step 210 is also termed "first user access data," and the user locations referred to in steps 220 and 230 is also termed "first user locations."

In some scenarios, target content can be categorized in a selected group by the web hosting system (e.g., a video can be grouped based on genre, topic of the video, etc.). In some instances, it can be reasonably assumed that users who access the target content are also likely access other content that is in the same selected group. Thus, evaluation of the trigger condition for the target content can also take into account access data for other content that is in the same selected group. For example, the method 200 can further include the following steps: identifying other content hosted by the web hosting system and categorized in the selected group; collecting, by the web hosting system, second user access data for the other content; extracting second user locations from the second user access data; detecting, from the second user locations, the area (associated with the second language); and re-evaluating the trigger condition, including comparing a second content metric (e.g., count, frequency, etc.), which measures user access to the other content of the group from the area, to a second content threshold. For instance, the trigger condition can be satisfied if the second content metric exceeds the second content threshold, or the trigger condition can fail to be satisfied if the second content metric falls below the second content threshold.

One specific way of grouping content is based on creator of the content. For example, the target content created by a creator can be categorized in a group which includes other content created by the same creator. Thus, the method 200 can further include the following steps: determining a creator of the target content; identifying other content created by the creator and hosted by the web hosting system; collecting, by the web hosting system, third user access data for the other content; extracting third user locations from the third user access data (associated with the second language); detecting, from the third user locations, the area; and re-evaluating the trigger condition, including comparing a creator metric (e.g., count, frequency, etc.), which measures user access to the other content of the creator from the area, to a creator threshold. For instance, the trigger condition can be satisfied if the creator metric exceeds the creator threshold, or the trigger condition can fail to be satisfied if the creator metric falls below the creator threshold.

In some circumstances, the target content is hosted on a container of the web hosting system. As described above, the container can be defined by the web hosting system, and example containers include websites, channels, playlists, groups or categories, etc. In such circumstances, it can be reasonably assumed that users who access the target content are also likely access other content that is in the same container. For example, if the website hosting the target content (presented in the first language) also includes a link to other content (presented in the second language), then the link can indicate that some users who speak the second language may be interested in accessing the target content. Thus, evaluation of the trigger condition for the target content can also consider language of other content that is in the same container. For example, the method 200 can further include the following steps: identifying other content hosted on the container of the web hosting system; and re-evaluating the trigger condition, including detecting at least some of the other content is presented in the second language. For instance, the trigger condition can be satisfied if more than a predefined percentage of other content in the same container is presented in the second language.

Example Machine Learning Model

In some examples, evaluating the trigger condition for selectively translating and indexing target content can be based on a machine learning model (e.g., the ML model 138).

In some examples, the ML model can comprise a neural network such as a deep neural network having an input layer, one or more hidden layers for which model parameters are computed, and an output layer. In some examples, the ML model can be configured to implement other algorithms, such as decision trees, Bayesian networks, supper vector machines, logistic regression, K-nearest neighbor, hidden Markov models, etc.

In some examples, the method 200 can further include training the ML model for detecting satisfaction of the trigger condition. For target content (presented in the first language), the ML model can be configured to generate a probability that the target content is to be accessed from areas associated with the second language. The trigger condition can be satisfied if the probability is greater than a predefined threshold.

In some examples, the training can include the following steps: collecting historical user access data for a set of content hosted by the web hosting system, wherein at least some content of the set of content was accessed from areas associated with languages that are different from the first language; and feeding the historical user access data to the ML model. After training, the ML model can, for any content hosted by the web hosting system, generate a plurality of probabilities for a plurality of languages. Such probabilities represent respective likelihood the content will be accessed by users for the corresponding languages.

As an example, the following (and a nonexclusive list of) historical user access data pertaining to video content can be collected and fed to the ML model for training purposes: video type (e.g., generic video, meeting recording, screen recording, etc.), user-classified video category (e.g., "nature video," "how-to video," etc.), duration of video, video size, video codec, video source (e.g., upload via web site, upload via file sync, upload from <app name>, etc.), storage location (e.g., Sharepoint/OneDrive/A website, etc.), sharing status (e.g., is video accessible to anyone, etc.), number of existing transcripts for the video, number of views of the video, etc.

Example Advantages

A number of advantages can be achieved via the technologies described herein.

As described above, conventional technologies face technical challenges of managing the discovery and comprehension of web content (including video, audio, and other multimedia assets) for users whose native language is different from the content's language. This is due to the impracticality of translating all content into multiple languages beforehand, which could potentially exhaust computing resources and result in unnecessary translations of content that may never be accessed by users.

The technical solutions described herein can predictively and selectively translate and index web content from one language to another based on collected data representing use access to the web content and/or organization of the web content. This technical feature can improve usability by enabling discovery of the web content during a search by a user whose native language is different from the language used in the web content. Importantly, this technical feature can improve utilization of computer resources by performing translation and indexing when and where they are most likely to be useful, and by avoiding translation and indexing operations for other web content.

Additionally, the technical solutions described herein can selectively generate a summary of the web content using a LLM after a user's discovery of the web content. This technical feature can improve usability by enhancing a user's understanding of the web content using the user's native language. Similarly, this technical feature can improve utilization of computer resources by generating summaries when and where they are most likely to be useful, and by avoiding generation of summaries for other web content.

Example Computing Systems

Figure 3:
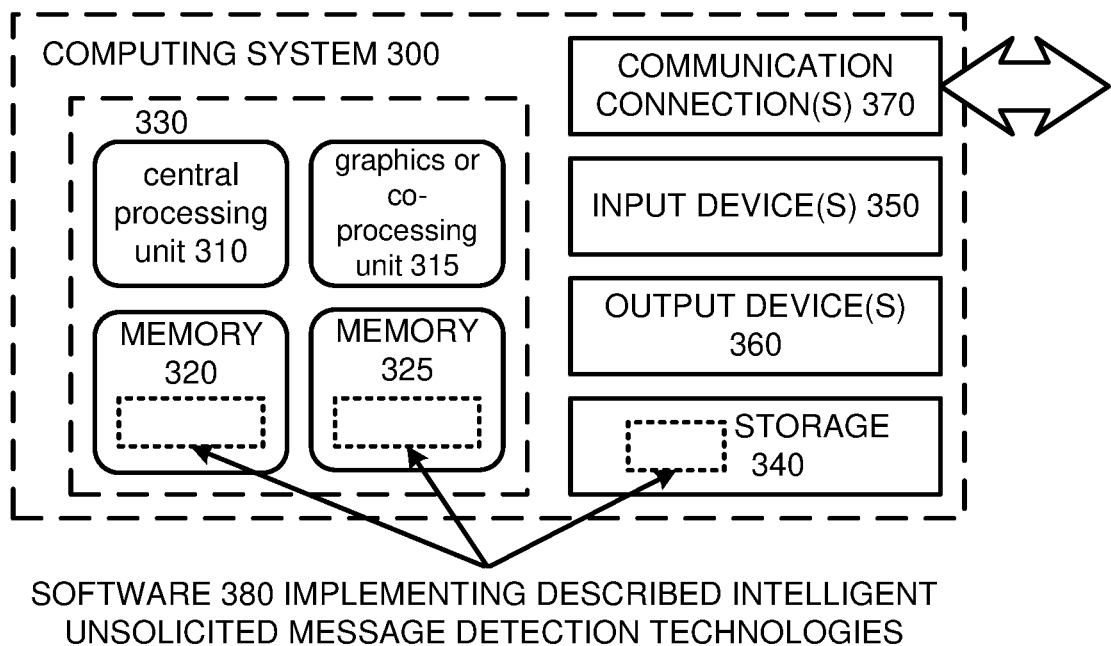
FIG. 3 is a block diagram of an example computing system in which described embodiments can be implemented.

FIG. 3 depicts an example of a suitable computing system 300 in which the described innovations can be implemented. The computing system 300 is not intended to suggest any limitation as to scope of use or functionality of the present disclosure, as the innovations can be implemented in diverse computing systems.

With reference to FIG. 3, the computing system 300 includes one or more processing units 310, 315 and memory 320, 325. In FIG. 3, this basic configuration 330 is included within a dashed line. The processing units 310, 315 can execute computer-executable instructions, such as for implementing the features described in the examples herein (e.g., the method 200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 3 shows a central processing unit 310 as well as a graphics processing unit or co-processing unit 315. The tangible memory 320, 325 can be volatile memory (e.g., registers, cache, RAM), non-volatile memory (e.g., ROM, EEPROM, flash memory, etc.), or some combination of the two, accessible by the processing unit(s) 310, 315. The memory 320, 325 can store software 380 implementing one or more innovations described herein, in the form of computer-executable instructions suitable for execution by the processing unit(s) 310, 315.

A computing system 300 can have additional features. For example, the computing system 300 can include storage 340, one or more input devices 350, one or more output devices 360, and one or more communication connections 370, including input devices, output devices, and communication connections for interacting with a user. An interconnection mechanism (not shown) such as a bus, controller, or network can interconnect the components of the computing system 300. Typically, operating system software (not shown) can provide an operating environment for other software executing in the computing system 300, and coordinate activities of the components of the computing system 300.

The tangible storage 340 can be removable or non-removable, and includes magnetic disks, magnetic tapes or cassettes, CD-ROMs, DVDs, or any other medium which can be used to store information in a non-transitory way and which can be accessed within the computing system 300. The storage 340 can store instructions for the software implementing one or more innovations described herein.

The input device(s) 350 can be an input device such as a keyboard, mouse, pen, or trackball, a voice input device, a scanning device, touch device (e.g., touchpad, display, or the like) or another device that provides input to the computing system 300. The output device(s) 360 can be a display, printer, speaker, CD-writer, or another device that provides output from the computing system 300.

The communication connection(s) 370 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 4:
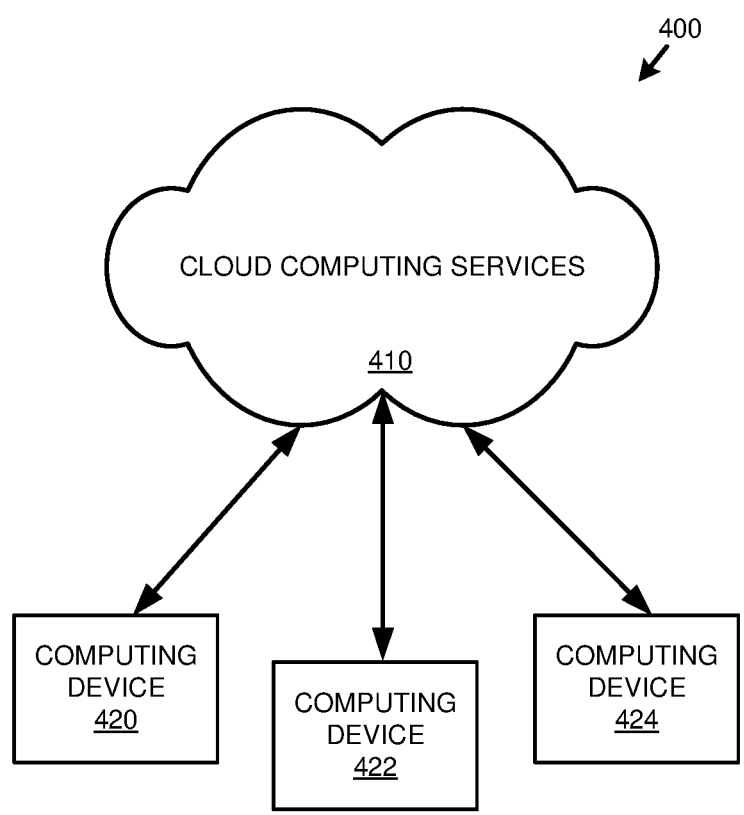
FIG. 4 is a block diagram of an example cloud computing environment that can be used in conjunction with the technologies described herein.

FIG. 4 depicts an example cloud computing environment 400 in which the described technologies can be implemented. The cloud computing environment 400 can include cloud computing services 410. The cloud computing services 410 can comprise various types of cloud computing resources, such as computer servers, data storage repositories, networking resources, etc. The cloud computing services 410 can be centrally located (e.g., provided by a data center of a business or organization) or distributed (e.g., provided by various computing resources located at different locations, such as different data centers and/or located in different cities or countries).

The cloud computing services 410 can be utilized by various types of computing devices (e.g., client computing devices), such as computing devices 420, 422, and 424. For example, the computing devices (e.g., 420, 422, and 424) can be computers (e.g., desktop or laptop computers), mobile devices (e.g., tablet computers or smart phones), or other types of computing devices. For example, the computing devices (e.g., 420, 422, and 424) can utilize the cloud computing services 410 to perform computing operations (e.g., data processing, data storage, and the like).

In practice, cloud-based, on-premises-based, or hybrid scenarios can be supported.

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

In any of the examples described herein, an operation performed in runtime means that the operation can be completed in real time or with negligible processing latency (e.g., the operation can be completed within 1 second, etc.).

Example Clauses

Any of the following example clauses can be implemented.

Clause 1. A computer-implemented method for selective indexing of target content, the method comprising: collecting, by a web hosting system which hosts the target content, first user access data for the target content, wherein the target content is presented in a first language; extracting first user locations from the first user access data; detecting, from the first user locations, an area associated with a second language that is different from the first language; evaluating a trigger condition, wherein the trigger condition is based at least in part on comparing a content metric, which measures user access to the target content from the area, to a content threshold; and responsive to detecting satisfaction of the trigger condition: translating the target content from the first language to the second language; and indexing the target content presented in the second language so as to enable the target content to be searched using the second language.

Clause 2. The computer-implemented method of clause 1, wherein the target content comprises video content.

Clause 3. The computer-implemented method of any one of clauses 1-2, wherein the target content comprises audio content.

Clause 4. The computer-implemented method of any one of clauses 1-3, wherein the target content comprises text-based content.

Clause 5. The computer-implemented method of any one of clauses 1-4, further comprising: responsive to detecting satisfaction of the trigger condition, prompting a large language model to generate a summary of the target content using the second language.

Clause 6. The computer-implemented method of any one of clauses 1-5, wherein the target content is categorized in a selected group by the web hosting system, the method further comprising: identifying other content hosted by the web hosting system and categorized in the selected group; collecting, by the web hosting system, second user access data for the other content; extracting second user locations from the second user access data; detecting, from the second user locations, the area; and re-evaluating the trigger condition, including comparing a second content metric, which measures user access to the other content from the area, to a second content threshold.

Clause 7. The computer-implemented method of any one of clauses 1-6, further comprising: determining a creator of the target content; identifying other content created by the creator and hosted by the web hosting system; collecting, by the web hosting system, third user access data for the other content; extracting third user locations from the third user access data; detecting, from the third user locations, the area; and re-evaluating the trigger condition, including comparing a creator metric, which measures user access to the other content from the area, to a creator threshold.

Clause 8. The computer-implemented method of any one of clauses 1-7, wherein the target content is hosted on a container of the web hosting system, the method further comprising: identifying other content hosted on the container of the web hosting system; and re-evaluating the trigger condition, including detecting at least some of the other content is presented in the second language.

Clause 9. The computer-implemented method of any one of clauses 1-8, further comprising training a machine learning model for detecting satisfaction of the trigger condition, wherein the machine learning model is configured to generate a probability that the target content is to be accessed from areas associated with the second language, wherein the training comprises: collecting historical user access data for a set of content hosted by the web hosting system, wherein at least some content of the set of content was accessed from areas associated with languages that are different from the first language; and feeding the historical user access data to the machine learning model.

Clause 10. The computer-implemented method of any one of clauses 1-9, wherein the trigger condition is further based at least in part on one or more of: a group in which the target content is categorized by the web hosting system; access patterns for other content in the group; a creator of the target content; access patterns for other content created by the creator of the target content; a container that hosts the target content on the web hosting system; and access patterns for other content in the container.

Clause 11. A computing system for selective indexing of target content, the computing system comprising: memory; one or more hardware processors coupled to the memory; and one or more computer readable storage media storing instructions that, when loaded into the memory, cause the one or more hardware processors to perform operations comprising: collecting, by a web hosting system which hosts the target content, first user access data for the target content, wherein the target content is presented in a first language; extracting first user locations from the first user access data; detecting, from the first user locations, an area associated with a second language that is different from the first language; evaluating a trigger condition, wherein the trigger condition is based at least in part on comparing a content metric, which measures user access to the target content from the area, to a content threshold; and responsive to detecting satisfaction of the trigger condition: translating the target content from the first language to the second language; and indexing the target content presented in the second language so as to enable the target content to be searched using the second language.

Clause 12. The computing system of clause 11, wherein the target content comprises video content.

Clause 13. The computing system of any one of clauses 11-12, wherein the target content comprises audio content.

Clause 14. The computing system of any one of clauses 11-13, wherein the target content comprises text-based content.

Clause 15. The computing system of any one of clauses 11-14, wherein the operations further comprise: responsive to detecting satisfaction of the trigger condition, prompting a large language model to generate a summary of the target content using the second language.

Clause 16. The computing system of any one of clauses 11-15, wherein the target content is categorized in a selected group by the web hosting system, wherein the operations further comprise: identifying other content hosted by the web hosting system and categorized in the selected group; collecting, by the web hosting system, second user access data for the other content; extracting second user locations from the second user access data; detecting, from the second user locations, the area; and re-evaluating the trigger condition, including comparing a second content metric, which measures user access to the other content from the area, to a second content threshold.

Clause 17. The computing system of any one of clauses 11-16, wherein the operations further comprise: determining a creator of the target content; identifying other content created by the creator and hosted by the web hosting system; collecting, by the web hosting system, third user access data for the other content; extracting third user locations from the third user access data; detecting, from the third user locations, the area; and re-evaluating the trigger condition, including comparing a creator metric, which measures user access to the other content from the area, to a creator threshold.

Clause 18. The computing system of any one of clauses 11-17, wherein the target content is hosted on a container of the web hosting system, wherein the operations further comprise: identifying other content hosted on the container of the web hosting system; and re-evaluating the trigger condition, including detecting at least some of the other content is presented in the second language.

Clause 19. The computing system of any one of clauses 11-18, wherein the trigger condition is further based at least in part on one or more of: a group in which the target content is categorized by the web hosting system; access patterns for other content in the group; a creator of the target content; access patterns for other content created by the creator of the target content; a container that hosts the target content on the web hosting system; and access patterns for other content in the container.

Clause 20. One or more non-transitory computer-readable media having encoded thereon computer-executable instructions causing one or more processors to perform operations for selective indexing of target content, the operations comprising: collecting, by a web hosting system which hosts the target content, first user access data for the target content, wherein the target content is presented in a first language; extracting first user locations from the first user access data; detecting, from the first user locations, an area associated with a second language that is different from the first language; evaluating a trigger condition, wherein the trigger condition is based at least in part on comparing a content metric, which measures user access to the target content from the area, to a content threshold; and responsive to detecting satisfaction of the trigger condition: translating the target content from the first language to the second language; indexing the target content presented in the second language so as to enable the target content to be searched using the second language; and prompting a large language model to generate a summary of the target content using the second language.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for selective indexing of target content, the method comprising:
    collecting, by a web hosting system which hosts the target content, first user access data for the target content, wherein the target content is presented in a first language;
    extracting first user locations from the first user access data;
    detecting, from the first user locations, an area associated with a second language that is different from the first language;
    evaluating a trigger condition, wherein the trigger condition is based at least in part on comparing a content metric to a content threshold, the content metric measuring user access to the target content from the area; and
    responsive to detecting satisfaction of the trigger condition:
        translating the target content from the first language to the second language; and
        indexing the target content presented in the second language so as to enable the target content to be searched using the second language.

2. The computer-implemented method of claim 1, wherein the target content comprises video content.

3. The computer-implemented method of claim 1, wherein the target content comprises audio content.

4. The computer-implemented method of claim 1, wherein the target content comprises text-based content.

5. The computer-implemented method of claim 1, further comprising: responsive to detecting satisfaction of the trigger condition, prompting a large language model to generate a summary of the target content using the second language.

6. The computer-implemented method of claim 1, wherein the target content is categorized in a selected group by the web hosting system, the method further comprising:
    identifying other content hosted by the web hosting system and categorized in the selected group;
    collecting, by the web hosting system, second user access data for the other content;
    extracting second user locations from the second user access data;
    detecting, from the second user locations, the area; and
    re-evaluating the trigger condition, including comparing a second content metric to a second content threshold, the second content metric measuring user access to the other content from the area.

7. The computer-implemented method of claim 1, further comprising:
   determining a creator of the target content;
   identifying other content created by the creator and hosted by the web hosting system;
   collecting, by the web hosting system, third user access data for the other content;
   extracting third user locations from the third user access data;
   detecting, from the third user locations, the area; and
   re-evaluating the trigger condition, including comparing a creator metric to a creator threshold, the creator metric measuring user access to the other content from the area.

8. The computer-implemented method of claim 1, wherein the target content is hosted on a container of the web hosting system, the method further comprising:
   identifying other content hosted on the container of the web hosting system; and
   re-evaluating the trigger condition, including detecting at least some of the other content is presented in the second language.

9. The computer-implemented method of claim 1, further comprising training a machine learning model for detecting satisfaction of the trigger condition, wherein the machine learning model is configured to generate a probability that the target content is to be accessed from areas associated with the second language, wherein the training comprises:
   collecting historical user access data for a set of content hosted by the web hosting system, wherein at least some content of the set of content was accessed from areas associated with languages that are different from the first language; and
   feeding the historical user access data to the machine learning model.

10. The computer-implemented method of claim 1, wherein the trigger condition is further based at least in part on one or more of:
    a group in which the target content is categorized by the web hosting system;
    access patterns for other content in the group;
    a creator of the target content;
    access patterns for other content created by the creator of the target content;
    a container that hosts the target content on the web hosting system; and
    access patterns for other content in the container.

11. A computing system for selective indexing of target content, the computing system comprising:
    memory;
    one or more hardware processors coupled to the memory; and
    one or more computer readable storage media storing instructions that, when loaded into the memory, cause the one or more hardware processors to perform operations comprising:
      collecting, by a web hosting system which hosts the target content, first user access data for the target content, wherein the target content is presented in a first language;
      extracting first user locations from the first user access data;
      detecting, from the first user locations, an area associated with a second language that is different from the first language;
      evaluating a trigger condition, wherein the trigger condition is based at least in part on comparing a content metric to a content threshold, the content metric measuring user access to the target content from the area; and
      responsive to detecting satisfaction of the trigger condition:
        translating the target content from the first language to the second language; and
        indexing the target content presented in the second language so as to enable the target content to be searched using the second language.

12. The computing system of claim 11, wherein the target content comprises video content.

13. The computing system of claim 11, wherein the target content comprises audio content.

14. The computing system of claim 11, wherein the target content comprises text-based content.

15. The computing system of claim 11, wherein the operations further comprise: responsive to detecting satisfaction of the trigger condition, prompting a large language model to generate a summary of the target content using the second language.

16. The computing system of claim 11, wherein the target content is categorized in a selected group by the web hosting system, wherein the operations further comprise:
    identifying other content hosted by the web hosting system and categorized in the selected group;
    collecting, by the web hosting system, second user access data for the other content;
    extracting second user locations from the second user access data;
    detecting, from the second user locations, the area; and
    re-evaluating the trigger condition, including comparing a second content metric to a second content threshold, the second content metric measuring user access to the other content from the area.

17. The computing system of claim 11, wherein the operations further comprise:
    determining a creator of the target content;
    identifying other content created by the creator and hosted by the web hosting system;
    collecting, by the web hosting system, third user access data for the other content;
    extracting third user locations from the third user access data;
    detecting, from the third user locations, the area; and
    re-evaluating the trigger condition, including comparing a creator metric to a creator threshold, the creator metric measuring user access to the other content from the area.

18. The computing system of claim 11, wherein the target content is hosted on a container of the web hosting system, wherein the operations further comprise:
    identifying other content hosted on the container of the web hosting system; and
    re-evaluating the trigger condition, including detecting at least some of the other content is presented in the second language.

19. The computing system of claim 11, wherein the trigger condition is further based at least in part on one or more of:
    a group in which the target content is categorized by the web hosting system;
    access patterns for other content in the group;
    a creator of the target content;
    access patterns for other content created by the creator of the target content;
    a container that hosts the target content on the web hosting system; and
    access patterns for other content in the container.

20. One or more non-transitory computer-readable media having encoded thereon computer-executable instructions causing one or more processors to perform operations for selective indexing of target content, the operations comprising:

- collecting, by a web hosting system which hosts the target content, first user access data for the target content, wherein the target content is presented in a first language;
- extracting first user locations from the first user access data;
- detecting, from the first user locations, an area associated with a second language that is different from the first language;
- evaluating a trigger condition, wherein the trigger condition is based at least in part on comparing a content metric to a content threshold, the content metric measuring user access to the target content from the area; and
- responsive to detecting satisfaction of the trigger condition:
  - translating the target content from the first language to the second language;
  - indexing the target content presented in the second language so as to enable the target content to be searched using the second language; and
  - prompting a large language model to generate a summary of the target content using the second language.

* * * * *